May 28, 1946.  R. KELLER  2,401,163
DEVICE FOR MEASURING MECHANICAL ACCELERATION BY ELECTRICAL MEANS
Filed Dec. 3, 1943  2 Sheets-Sheet 1

Inventor:
Robert Keller,
By
Pierce & Scheffler,
Attorneys.

Patented May 28, 1946

2,401,163

UNITED STATES PATENT OFFICE 2,401,163

DEVICE FOR MEASURING MECHANICAL ACCELERATION BY ELECTRICAL MEANS

Robert Keller, Ennetbaden, Switzerland, assignor to Aktiengesellschaft Brown, Boveri & Cie, Baden, Switzerland Application December 3, 1943, Serial No. 512,822
In Switzerland October 29, 1942

11 Claims. (Cl. 290—40)

Mechanical speed regulators are known which employ the change in velocity, that is the differential coefficient of the speed, in order to regulate the speed of a machine. These apparatus are known as accelerometers and are generally used in conjunction with tachometers in order to stabilize these latter. The tachometer thus serves to determine the absolute value of the speed whilst the accelerometer fixes the stability. These mechanical accelerometers consist generally of a flywheel mass connected to a rotating shaft by means of a spring, the mass rotating with the same angular velocity as the shaft. When the speed of rotation of the shaft changes the flywheel mass is accelerated, but due to its inertia a certain time-lag occurs and the displacement of the flywheel mass relative to the shaft can be used indirectly, for instance hydraulically, to control a servomotor which is also under the influence of the main governor or tachometer and regulates the supply of motive power to the machine.

These mechanical accelerometers possess the disadvantage that either the natural frequency of the flywheel mass has a disturbing effect on the apparatus or the rated velocity of the centrifugal governor must be changed to another speed range which is, however, unfavourable in other respects.

The object of the present invention is to devise a device for measuring mechanical acceleration by purely electrical means. According to the invention this is achieved by providing means which measure the rate of change of a frequency proportional to the speed and in a manner which is independent of the voltage.

Figure 1:
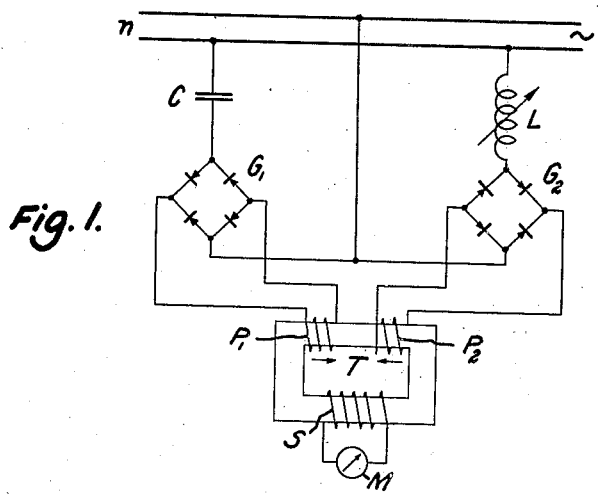
Figure 3:
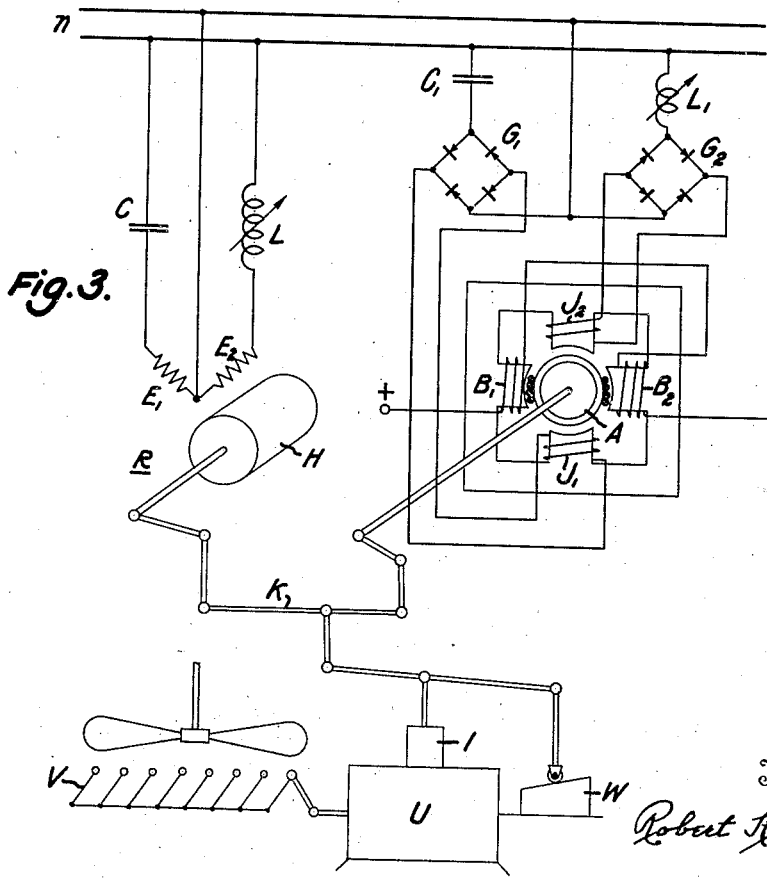
Figure 2:
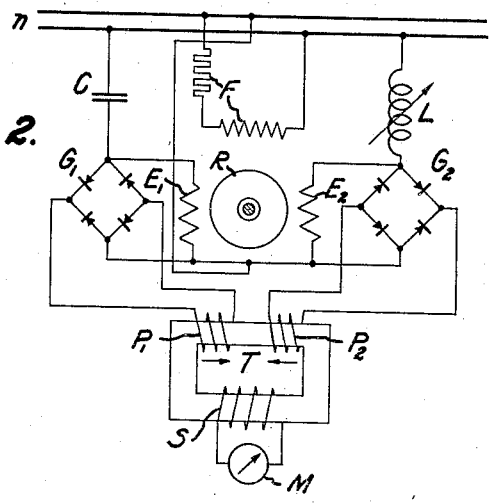
Figure 4:
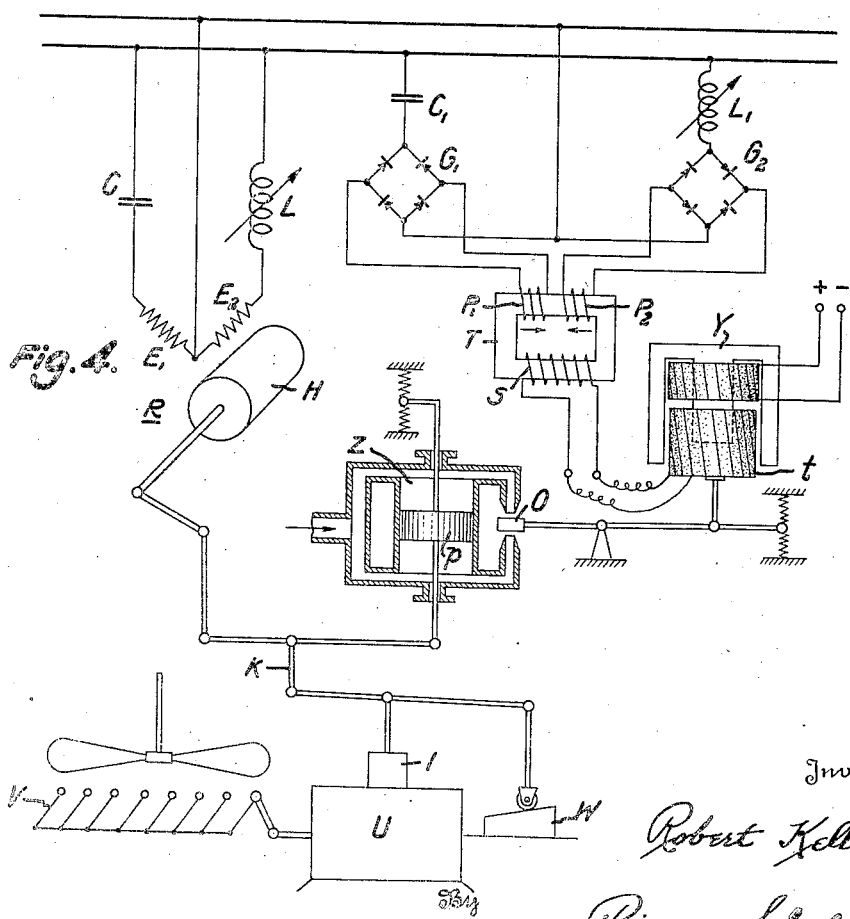

The invention is explained by means of the constructional examples illustrated diagrammatically in the accompanying drawings where Fig. 1 shows the fundamental diagram of connection for measuring the acceleration or rate of change of the frequency, whilst Figs. 2–4 illustrate constructional forms of the invention where the accelerometer is employed in conjunction with a frequency regulator.

In Fig. 1 $n$ represents a single phase network or two phases of a three-phase network to which two circuits are connected which contain alternating current impedances having different frequency characteristics. One circuit is mainly capacitive and contains the capacity $c$ whilst the other is mainly inductive and contains inductance $L$. A voltage proportional to the current is taken from each circuit and after being rectified in the rectifiers $G_1$ and $G_2$ respectively, is supplied to the differentially wound primary windings $P_1$, $P_2$ of a transformer $T$. $L$ and $C$ neutralize each other at a certain frequency in the network $n$. As soon as a change in frequency occurs the influence of either the inductance or capacity predominates and the currents in the circuits $L$ and $C$ are no longer equal. A field is thus produced in the iron core and during a change in the field strength a voltage will be induced at the secondary winding $S$ of the transformer $T$. The magnitude of this voltage is indicated by the instrument $M$ and is a measure of the rate of change of the frequency or the acceleration. The correctness of this assumption is proved by the following simple considerations.

In the capacitive circuit the current $(I_c)$ varies proportionally with the frequency of the network $n$, whilst in the circuit containing the inductance $L$ the current $(I_L)$ is inversely proportional to the network frequency.

The currents in both circuits are therefore $$I_c = VC\omega \text{ and } I_L = \frac{V}{L\omega}.$$

where $V$ is the voltage on the network $n$, and $\omega$ is equal to $2\pi \times$ frequency.

The voltage $E$ in the secondary winding $S$ of the transformer $T$ is obtained as follows:

$$E = K\left[CV \cdot \frac{d\omega}{dt} + \frac{V}{L\omega} \cdot \frac{d\omega}{dt}\right] = K\frac{d\omega}{dt}\left(CV + \frac{V}{L\omega}\right)$$

where $K$ is a constant.
This equation shows when $$\frac{d\omega}{dt} = 0$$

the voltage in the secondary winding $S$ is zero. In other words the measuring instrument $M$ only shows a reading when there is a frequency change.

$$\left(\frac{df}{dt}\right)$$

in the network $n$ or a change in the speed $$\left(\frac{d\omega}{dt}\right)$$

of the machine supplying the network. A voltage variation in the network $n$ has no effect on the device. The device described thus acts as an electrical accelerometer and can also be constructed as a regulator in the manner described below.

A combined electrical accelerometer and frequency regulator is illustrated in Fig. 2. The device for measuring the rate of change of the frequency is exactly the same as that shown in Fig. 1 and the various elements of this device are indicated in both figures by the same reference characters. The frequency regulator R provided for regulating the frequency of the network $n$ is of a known kind and has a rotating system with two excitation windings $E_1$, $E_2$, one of which is purely inductive and the other purely capacitive, as in the case of the accelerometer, the capacity and inductance being so dimensioned that they neutralize each other at the desired normal frequency. The circuits provided for the accelerometer can therefore also be used for the resonance connection system of the regulator if the windings $E_1$, $E_2$ are respectively connected to the network $n$ over the capacity C and the inductance L. F is the fundamental excitation winding of the regulator R.

The slightest deviation from the predetermined frequency immediately causes a rapid change in current and phase position and depending upon whether the inductance L or the capacity C is greater a torque is produced in the regulator R in one or the other direction thus causing the system of rotation to operate. At the same time the rate of change of frequency which occurs when the frequency deviates from the predetermined frequency has a certain value which in the manner already described produces a voltage in the secondary winding S of the transformer T. The rate of change in frequency, either in the positive or negative sense, thus becomes immediately visible on the indicating instrument M of the accelerometer. The deflection of the instrument M is thus always a measure for the differential coefficient of the frequency whilst the deflection of the regulator always depends on the amount by which the frequency differs from the prescribed value. This enables the electrical accelerometer to be used as a stabilizing device for the frequency regulator if the measuring instrument M is replaced by a suitable transmission system which also acts on the governing system actuated by the frequency regulator. Two constructional examples of such stabilizing arrangements are illustrated in Figs. 3 and 4.

In Fig. 3 R is the frequency regulator whose excitation windings $E_1$, $E_2$ are again connected over a capacity C and an inductance L respectively to the network $n$. The rotating drum H of the regulator is connected by means of linkage K to the control valve I of the servomotor U that operates the gate valve vanes V of the hydraulic turbine. The servomotor U may be of any known fluid operated type, its function being that of an energy-amplifier to develop power sufficient to adjust the gate valve in proportion to the actuation of the control valve I. This latter is coupled to a generator not shown in the drawings which supplies the network $n$. W is the mechanical device for the return movement of the control system. When the frequency deviates from the prescribed frequency the frequency regulator R regulates the supply of driving medium to the turbine by actuating the servomotor U. The stabilization of the regulator is achieved by means of a direct-current rotating system whose armature A is also coupled to the linkage K. In addition to the constant direct-current excitation $B_1$, $B_2$ this rotating system is also provided with a cross-field excitation comprising the differentially connected cross-field excitation windings $J_1$, $J_2$. The winding $J_1$ is connected over the rectifier $G_1$ and the capacity $C_1$, the other winding $J_2$ over the rectifier $G_2$ and the inductance $L_1$ with the network $n$, and when the frequency is constant the effects of the windings $J_1$, $J_2$ neutralize each other and the armature remains at a standstill. As soon as a change in frequency occurs in the network $n$ the windings $J_1$, $J_2$ will cause a change in flux which produces currents in the armature A. These currents have a direction depending upon whether the change in flux is positive or negative and produce in conjunction with the excitation due to the windings $B_1$, $B_2$ a corresponding torque in the armature A whereby the linkage K is displaced. This displacement of the linkage K by the armature A occurs immediately upon a change in frequency and at first supplements the actuation of the servomotor valve I by the regulator R which occurs later. After a short time, however, the algebraic sign of the rate of frequency change reverses as the speed of the hydraulic turbine and the alternating current generator are varied by the adjustment of the servomotor valve I, and the reversal of the rate of frequency change results in a reversal of the direction of rotation of the armature A. The drum H of the regulator R rotates in the same direction throughout any one control operation and, except for the armature A, would move the servomotor valve progressively until the turbine speed reached a value corresponding to normal network frequency. This would result in a "hunting" regulation as there is an appreciable time lag before the turbine can attain the speed corresponding to a change in the setting of the valve I. This hunting is eliminated by the accelerometer control of the armature A which reverses direction to actuate the linkage K in opposition to the regulator drum H upon a reversal of the sense of the change in frequency. Stabilization of the turbine-generator system is thus attained at a network frequency that differs somewhat from the normal network frequency.

With the arrangement shown in Fig. 4 a voltage proportional to the current is taken both from the inductive and capacitive circuit connected to the network $n$, exactly as in Fig. 1, and after rectification is passed on to the differentially connected primary windings $P_1$, $P_2$ of the transformer T. The voltage occurring in the secondary windings S when the frequency changes is in this case used to excite the dip coil $t$ of a dip-coil magnet Y, whereby according to the direction of the excitation current the moveable coil is pulled into or out of the magnet. This coil $t$ is coupled with the control plate $o$ of a so-called impact-plate valve. The fluid pressure equilibrium in the control apparatus Z varies according to the position of this control plate $o$ and the piston $p$ moves either up or down whereupon the motion of the dip-coil $t$ is magnified and transmitted to the linkage K. The frequency regulator R operates in exactly the same way as has already been described in connection with the arrangement shown in Fig. 3 and stabilization is achieved as a function of the differential coefficient of the frequency.

It is of course also possible with the arrangements shown in Figs. 3 and 4 to connect the frequency regulator R and the accelerometer over common inductive and capacitive circuits to the network $n$ as is illustrated in Fig. 2.

I claim:

1. In apparatus responsive to speed accelerations, an alternating current network traversed by current that varies in frequency with the speed in question, a circuit of capacitive reactance and a circuit of inductive reactance connected in parallel aross said network, said circuits each including rectifier means and a winding traversed by rectified current, said windings being on a common magnetic field structure and establishing opposing fields therein, an additional winding on the magnetic field structure, and a device including a member selectively movable in opposite directions in response to currents induced in said additional winding upon a change in frequency of the network current.

2. In apparatus responsive to speed accelerations, the invention as recited in claim 1 wherein the direct current windings of said parallel connected circuits are primary windings of a current transformer, said additional winding is a secondary winding of the transformer, and said device is a measuring instrument having a pointer movable to indicate the sense and rate of change in speed.

3. In apparatus responsive to speed accelerations, the invention as recited in claim 1 wherein the direct current windings of said parallel connected circuits are primary windings of a current transformer, said additional winding is a secondary winding of the transformer, and said device is a dipping coil magnetic system including a dip-coil connected across said transformer secondary winding.

4. In apparatus responsive to speed accelerations, the invention as recited in claim 1, in combination with speed regulating means selectively operable in opposite directions in response to changes in the network frequency.

5. In apparatus responsive to speed accelerations, the invention as recited in claim 1, in combination with speed regulating means selectively operable in opposite directions in response to changes in the network frequency, said regulating means having a pair of excitation windings connected across said network by circuits of inductive and capacitive reactance respectively.

6. In apparatus responsive to speed accelerations, the invention as recited in claim 1, in combination with speed regulating means selectively operable in opposite directions in response to changes in the network frequency said regulating means having a pair of excitation windings included respectively in said parallel connected circuits.

7. In apparatus responsive to speed accelerations, the invention as recited in claim 1, in combination with speed regulating means selectively operable in opposite directions in response to changes in the network frequency, and means operable by said device to stabilize the operation of said speed regulating means.

8. In apparatus for controlling the speed of a prime mover driving an alternating current generator working into an alternating current network, a control element movable in opposite directions to regulate the prime mover speed, a mechanical linkage for actuating said control element, speed regulating means connected to said linkage and including a capacitive and an inductive circuit connected across said network, and rebalancing means comprising a member connected to said linkage and electrical accelerometer means for displacing said member in accordance with the sense and rate of frequency change in said network.

9. In apparatus for controlling the speed of a prime mover driving an alternating current generator working into an alternating current network, the invention as recited in claim 8 wherein said electrical accelerometer means comprises an inductive circuit and a capacitive circuit connected in parallel across said network, rectifier means and a direct current circuit energized thereby in each of said parallel connected circuits, a transformer having opposed primary windings in the respective direct current circuits, a transformer secondary winding, and means energized by said secondary winding for actuating the member of said rebalancing means.

10. In apparatus for controlling the speed of a prime mover driving an alternating current generator working into an alternating current network, the invention as recited in claim 8 wherein said rebalancing means comprises a direct current rotary system having a closed winding on an armature connected to said linkage member, a magnetic field structure for said armature including opposed poles carrying windings energized by a direct current source, a second set of opposed poles normal to said direct current poles, windings on the poles of said second set, and circuits of inductive and capacitive type connected across said network in parallel and including rectifiers for supplying current to the windings of the second set of poles.

11. In apparatus for controlling the speed of a prime mover driving an alternating current generator working into an alternating current network, the invention as recited in claim 8 wherein said rebalancing means includes fluid pressure means for actuating said member, a dip-coil controlling said fluid pressure means, a current transformer having a secondary winding for energizing said dip coil, a pair of frequency selective circuits connected across said network and including rectifiers for supplying current to opposed primary windings of said transformer.

ROBERT KELLER.